United States Patent [19]
Borkenhagen et al.

[11] Patent Number: 6,119,202
[45] Date of Patent: *Sep. 12, 2000

[54] METHOD AND APPARATUS TO INTERLEAVE LEVEL 1 DATA CACHE LINE FILL DATA BETWEEN SYSTEM BUS AND LEVEL 2 DATA CACHE FOR IMPROVED PROCESSOR PERFORMANCE

[75] Inventors: John Michael Borkenhagen; James Ira Brookhouser, both of Rochester, Minn.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/899,850

[22] Filed: Jul. 24, 1997

[51] Int. Cl.$^7$ .................................................. G06F 12/00
[52] U.S. Cl. ............................ 711/118; 711/127; 711/122
[58] Field of Search ................................. 711/122, 118, 711/117, 119, 127, 123, 120, 121

[56] References Cited

U.S. PATENT DOCUMENTS

| | | | |
|---|---|---|---|
| 5,261,066 | 11/1993 | Jouppi et al. | 395/425 |
| 5,367,660 | 11/1994 | Gat et al. | 395/425 |
| 5,526,510 | 6/1996 | Akkary et al. | 395/460 |

OTHER PUBLICATIONS

IBM Technical Disclosure Bulletin, vol. 36, No. 12, Dec. 1993, p. 611, "A Protocol for Processing Concurrent Misses".

Israel, Paul et al, 1995 Electronic Engineering Times (Jun. 19), pp. 78–80, "Chip Set Aims to Speed Secondary Cache—Parallelism Enhances Level 2 Cache Runs".

Jouppi, Norman P., 17th Annual International Symposium on Computer Architecture (May 28–31, 1990), pp. 364–373, "Improving Direct–Mapped Cache Performance by the Addition of a Small Fully–Associative Cache and Prefetch Buffers".

Stiliadis, Dimitrios et al, IEEE Proceedings of the 27th Annual Hawaii International Conference on System Sciences (1994), pp. 412–421, "Selective Victim Caching: A Method to Improve the Performance of Direct–Mapped Caches".

Stiliadis, Dimitrios et al, IEEE Transactions on Computers, vol. 46, No. 5 (May 1997), pp. 603–610, "Selective Victim Caching: A Method to Improve the Performance of Direct–Mapped Caches".

*Primary Examiner*—Eddie P. Chan
*Assistant Examiner*—Kimberly McLean
*Attorney, Agent, or Firm*—Schmeiser, Olsen & Watts; Michael F. Hoffman; S. Jared Pitts

[57] ABSTRACT

A method and apparatus is disclosed to improve the transfer of data from a transition cache to a level one data cache wherein the transition cache is receiving data from a plurality of data devices. In particular, logic is implemented via a line fill sequencer that allows for the interleaving of data packets being written into the level one data cache. Thus, data packets originating from a "fast" level two data cache can be interleaved with data originating from a "slow" system bus to avoid delays to the data originating from the level two data cache. Accordingly, the cache miss sequencer tracking the data from the level two data cache can be retired sooner.

17 Claims, 3 Drawing Sheets

METHOD AND APPARATUS TO INTERLEAVE LEVEL 1 DATA CACHE LINE FILL DATA BETWEEN SYSTEM BUS AND LEVEL 2 DATA CACHE FOR IMPROVED PROCESSOR PERFORMANCE

FIELD OF THE INVENTION

The present invention relates to computer systems that utilize a data cache, and more particularly, to a method and apparatus for interleaving line fill data being written into a level one data cache from a transition cache.

BACKGROUND OF THE INVENTION

Most of today's computer systems utilize various types of cache memory systems to improve system performance. A data cache is a small high speed memory device that temporarily holds data needed by the central processing unit (CPU) and other system devices. By anticipating data requirements, collecting data ahead of time (i.e., prefetching), and storing the data in a data cache, the time consuming step of retrieving the data from the computer's main memory "on the fly" is often eliminated.

However, in order for a data cache to be useful (and therefore avoid the latencies caused during data retrievals from large main memory), the cache must first be efficiently loaded with the data needed by the CPU. The process of loading data into a cache is performed by the computer's line fill control logic and is termed "filling" a line. By this process, a cache is loaded, line by line, with data from either the main memory, or a higher level cache for use by a specific processor or set of processors attached to this cache. Each line of data contains a predetermined number of bytes of information (e.g., 128 bytes). During a line fill operation, each line of data can be broken up into smaller "data packets" of a predetermined size (e.g., quad-words consisting of 16 bytes or oct-words consisting of 32 bytes).

If the data needed by the CPU is not in the data cache, a "cache miss" occurs and the computer system is then forced to look in main memory for the data. Each time a cache miss occurs, the system must allocate a system resource such as a cache miss (Cmiss) sequencer to track the retrieval of the data from main memory. Because a typical computer system has a limited number of such resources allocated to track and retrieve data from main memory, the CPU is often forced to wait until one is available when a subsequent cache miss occurs.

Cmiss sequencers are a limited resource, and when all of them are tied up for line fill operations, processor performance is directly affected, as the processor has to stall when it cannot get a free Cmiss sequencer when it requires one. Each Cmiss sequencer consists of a significant amount of hardware responsible for tracking an outstanding cache miss, and most processor implementations utilizing such systems therefore have a limited number of such sequencers (e.g., three). Therefore, efficient use of the Cmiss sequencers is generally considered to be a key to achieving a high level of processor performance.

Therefore, without some means for more efficiently delivering data to an L1 Dcache from an intermediate cache that is receiving data at different speeds from different devices, computer system performance will be negatively impacted.

SUMMARY OF THE INVENTION

The present invention overcomes the above-mentioned limitations by providing a computer system that comprises an intermediate cache called a transition cache (Tcache) for buffering lines of data being read from a first set of data devices (e.g., a level 2 data cache, system bus, etc.) and written to a primary cache (e.g., a level 1 data cache); and a line fin sequencer for controlling and managing the flow of data from the transition cache to the primary cache. In particular, the line fill sequencer allows a first set of sequentially transmitted data packets (which together form a first "line" of data) originating from a first data device to be transmitted in an interleaved manner with a second set of sequentially transmitted data packets (which together form a second "line" of data) originating from a second data device. More particularly, the system includes a process wherein any "available" data packet, regardless of origin, can be written from the Tcache into the primary cache as soon as the data packet is present in the Tcache, rather than waiting for all of the packets of a previous line of data to be transferred.

It is, therefore, an advantage of the present invention that this solution allows an L1 Dcache line fill sequencer to more efficiently utilize the limited background cycles (i.e., those cycles during which the processor does not need to use the L1 Dcache) to transfer any fill data available in the Tcache. Specifically, the line fill sequencer will not wait before starting to fill the L1 Dcache with the Tcache line that has available fill data provided by the L2 Dcache, thereby taking advantage of available background cycles, and reducing the overall number of cycles it takes to fill multiple cache lines in the L1 Dcache. This in turn "frees" up a cache miss sequencer earlier, and therefore reduces the likelihood of a stall by the processor.

DESCRIPTION OF THE INVENTION

Overview

Figure 1:
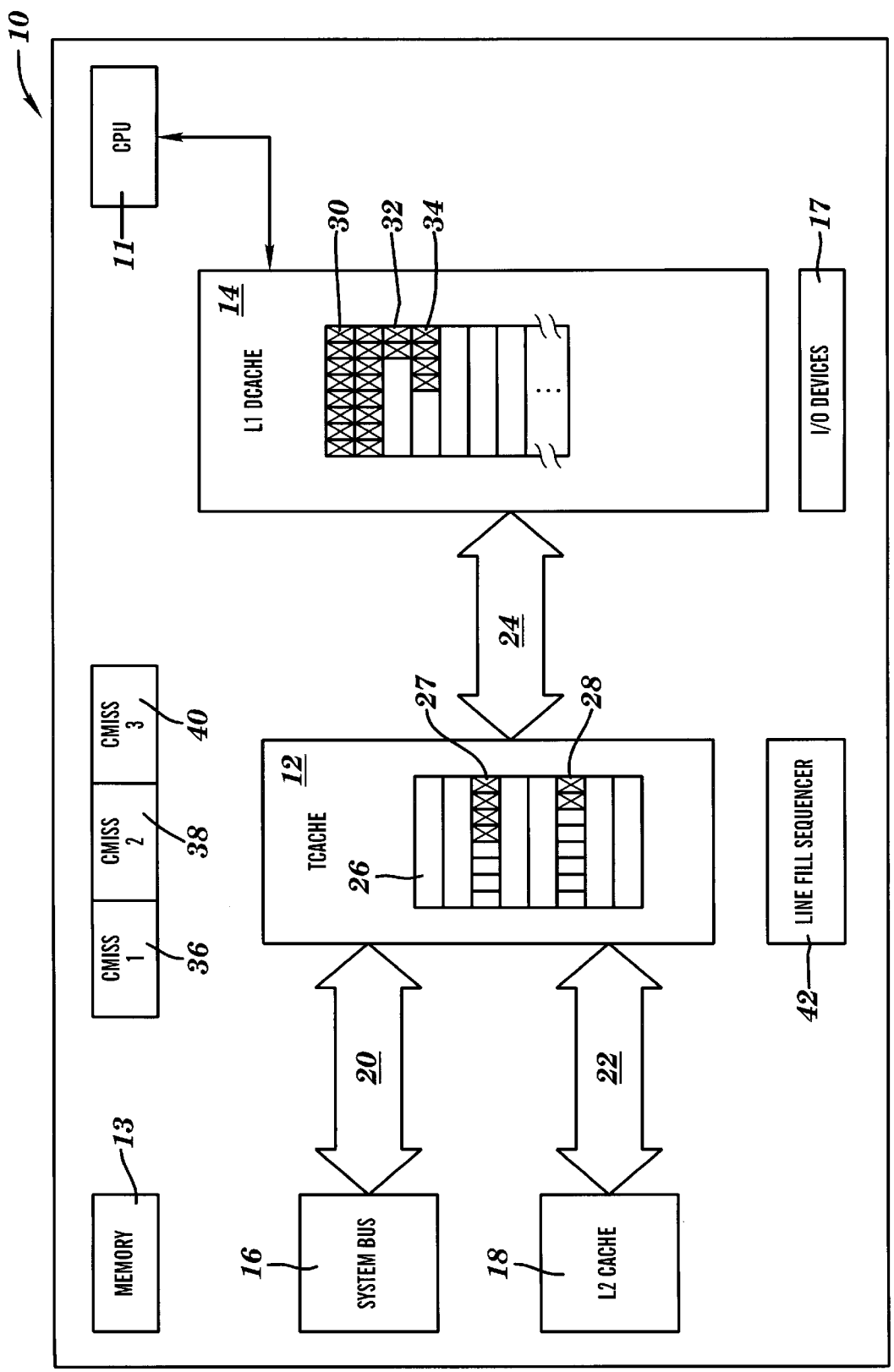
FIG. 1 depicts is a block diagram of a computer system in accordance with a preferred embodiment of the present invention.

Some CPU systems employ multiple levels of data caching, such as a level two cache (L2 Dcache), a transition cache (Tcache), and a level one cache (L1 Dcache). The Tcache is utilized to buffer data being written to the L1 Dcache from either the L2 Dcache or a system bus (see FIG. 1). Likewise, the Tcache may be used to buffer data being written to the L2 Dcache and system bus. A Tcache system is described in more detail in pending U.S. Patent Application entitled "MULTI-ENTRY FULLY ASSOCIATIVE TRANSITION CACHE," Ser. No. 08/761,378, filed on Dec. 9, 1996, and assigned to IBM Corporation, herein incorporated by reference.

Because a Tcache may receive L1 Dcache "fil" data from either the system bus, or the L2 Dcache, each of which has a different bandwidth to the Tcache, the Tcache may receive L1 Dcache fill data at different rates depending on the source of that data. For instance, a system bus with a 3:1 bus clock to processor clock ratio, and a 16-byte interface to the Tcache, will require at least 24 cycles to transfer an entire 128-byte cache line into the Tcache. Alternatively, an L2 Dcache with a bandwidth of 32 bytes to the Tcache can transfer that same 128 bytes of the data in as little as four cycles. Similarly, with a bandwidth of 32 bytes between the Tcache and the L1 Dcache, it will take as little as four cycles to transfer all 128 bytes of data from the Tcache into the L1 Dcache.

Because it may take from four to 28 cycles to place a line of data into the Tcache, the L1 Dcache line fill control logic may find that there are cycles in which the Tcache does not have any more data available for the line currently being filled, and it would generally "waste" those cycles and re-attempt to get that data in the future. For example, this circumstance occurs when the system bus writes data into the Tcache at a slower speed than the L1 Dcache line fill control logic can read it out.

Moreover, if the L1 Dcache line fill control logic starts to fill data from the Tcache that originated from the system bus, and the L2 Dcache subsequently begins to fill a line of data into the Tcache, the L2 Dcache line fill data will sit in the Tcache until the line fill request for the system bus line fill data has been completed. Thus, if the Tcache is in the middle of writing a "slow" line of data from the system bus, a "fas" line of data from the L2 Dcache will have to wait until all of the packets of the slow data are received from the system bus and written to the L1 Dcache. When this happens, the system performance will be impacted because, among other things, the Cmiss sequencer tracking the data from the L2 Dcache must also wait before being retired.

The system bus 16 has a 16-byte interface to the Tcache with either a 2:1 or 3:1 processor clock to bus clock ratio. This means that one bus cycle is either two or three processor cycles. Note that other processor clock to bus clock ratios, such as 4:1, 5:1, etc., are likewise possible. Both the L1 Dcache and the L2 Dcache have a 32-byte interface to the Tcache. Such processors also incorporate L1 Dcache line fill control logic in the hardware that has the responsibility of transferring 128 bytes of data (1 cache line) into the L1 Dcache from Tcache. During any one cycle, this control logic may transfer either one quadword (16 bytes), or one octword (32 bytes) of data depending on the availability of both data in the Tcache and the availability of the L1 Dcache and Tcache interfaces from L1 Dcache line fill control logic.

As the system bus is run at either a 3:1 or 2:1 clock/bus ratio with only a 16-byte interface into the Tcache, and the L1 Dcache has a 1:1 clock/bus ratio with a 32-byte interface to the Tcache, there would otherwise be cycles in which the L1 Dcache bandwidth to the Tcache is not fully utilized during the L1 Dcache line fill if the system bus is providing the Tcache data for the L1 Dcache line fill.

Pursuant to this invention, the line fill control logic is able to look for available data in other cache lines residing in the Tcache waiting to be filled into the L1 Dcache if no data is available for the current line being filled. If such data is found, the L1 Dcache line fill control logic will temporarily suspend the current line fill, and start filling the line which has data available rather than waste its bandwidth waiting for the system bus to deliver more data to the Tcache. Because the L2 Dcache has the same bandwidth into the L1 Dcache, the L1 Cache line fill control logic will not have a problem finding available data in the Tcache for lines being filled by the L2 Dcache. Once the second line has been filled, the L1 Dcache line fill control logic will continue its fill of the first line assuming there is data available for it at this time. Otherwise, it will start a fill from another line being provided to the Tcache by the L2 Dcache if such data exists.

The important result from this improvement is that the L1 Dcache line fill sequencer is able to retire the Cmiss sequencers earlier by interleaving the fill lines. This will improve processor performance by avoiding stalls that take place when the processor is forced to wait for a Cmiss sequencer because all existing Cmiss sequencers are tied up performing previous line fill operations.

DETAILED DESCRIPTION

Referring now to the figures, FIG. 1 depicts a computer system 10 showing the fundamental components of the present invention. Computer system 10 includes all of the traditional components found in a typical computer system (e.g., a CPU 11, memory 13, system bus 16, and I/O devices 17). Additionally, a transition cache (Tcache) 12 is shown interfaced to a pair of data devices consisting of system bus 16 and a level 2 data cache (L2 Dcache) 18 via lines 20 and 22 respectfully. Tcache 12 is further interfaced via a line 24 to a level 1 data cache (L1 Dcache) 14 which acts as the primary data cache for CPU 11. Pursuant to this embodiment, data required by the L1 Dcache 14 is first loaded into Tcache 12 from either the system bus 16 and L2 Dcache 18, and then transferred into the L1 Dcache. While this embodiment depicts a system with only two data devices that feed the Tcache, it is understood that additional data devices (e.g., other data caches) could be incorporated.

To manage and control the flow of data into the L1 Dcache from the Tcache, a line fill sequencer 42 is utilized. Line fill sequencer 42 includes logic that, among other things, handles the situation where lines of data from both the system bus 16 and L2 Dcache 18 are being written into the Tcache simultaneously. The line fill sequencer 42 may be implemented by hardware (e.g., logic gates), software (e.g., stored in read only memory), or a combination of both.

Also shown in computer system 10 is a plurality of cache miss (Cmiss) sequencers 36, 38 and 40. Each Cmiss sequencer is utilized to track the retrieval of a line of data needed by CPU 11 whenever a cache miss occurs. As noted above, processor delays may occur anytime a Cmiss sequencer is unavailable to oversee the retrieval of a line of data. Thus, the faster each line of data can be delivered into the L1 Dcache after a cache miss, the sooner the relevant Cmiss sequencer can be retired, thereby avoiding undesired delays.

Tcache 12 operates as a buffer for data being written into the L1 Dcache from both the system bus 16 and L2 Dcache 18. A typical Tcache 12 comprises eight cache lines 26 wherein each cache line can hold 128 bytes of data. Each cache line 26 can receive and hold a complete line of sequentially transmitted packets of data (each data packet typically comprises 16 or 32 bytes) from either the system bus 16 or L2 Dcache 18. Moreover, multiple lines within Tcache 12 may be utilized in parallel to read and buffer data packets during times when both the L2 Dcache and system bus are writing data to the Tcache simultaneously. Thus, a first cache line 27 could be used to hold data packets originating from the system bus, while a second cache line 28 could be used to hold data packets originating from the L2 Dcache. As noted, the size of the data packets and rate at which they are written into the Tcache 12 depend upon the data device from which they originate. For example, system bus 16 would typically include a 16-byte interface with the Tcache 12. Therefore, each line of data from the system bus would be transmitted in data packets comprised of 16-byte "quad-words." Alternatively, L2 Dcache has a 32-byte interface with the Tcache. Therefore, each line of data from the L2 Dcache would be transmitted in data packets comprised of 32-byte "oct-words."

Once in the Tcache 12, data packets are stored in their predetermined cache line until they can be forwarded to the L1 Dcache 14. The line fill sequencer 42 is responsible for controlling and managing the flow of data packets from the Tcache into the L1 Dcache 14. Pursuant to this invention, the line fill sequencer continuously looks in the Tcache 12 for any available data packets ready for delivery to the L1 Dcache, and does not care about the origin of the data packet or the possibility that an incomplete line of data may exist in the L1 Dcache. A system is therefore provided wherein multiple cache lines in the L1 Dcache can be filled in parallel. For example, data packets from Tcache line 27 that fill L1 Dcache line 32 may be transmitted in an interleaved manner with data packets from Tcache line 28 that fill L1 Dcache line 34.

The L1 Dcache 14 includes a plurality of cache lines 30 made up of 128-byte data spaces. Like the Tcache line 26, each of these cache lines 30 is capable of holding 8 quad words or 4 oct-words. As described herein, it is possible to fill a first line 32 and a second line 34 in an interleaved manner. By interleaving the data packets flowing from the Tcache 12 to the L1 Dcache 14, data packets originating from the L2 Dcache need not wait for a complete line of system bus data to be completely written into the L1 Dcache before the L2 cache data packets can be written into the L1 Dcache. Because L2 Dcache data can flow faster, cache miss sequencers 36, 38 and 40 tracking data from the L2 Dcache can often be retired sooner.

Figure 2:
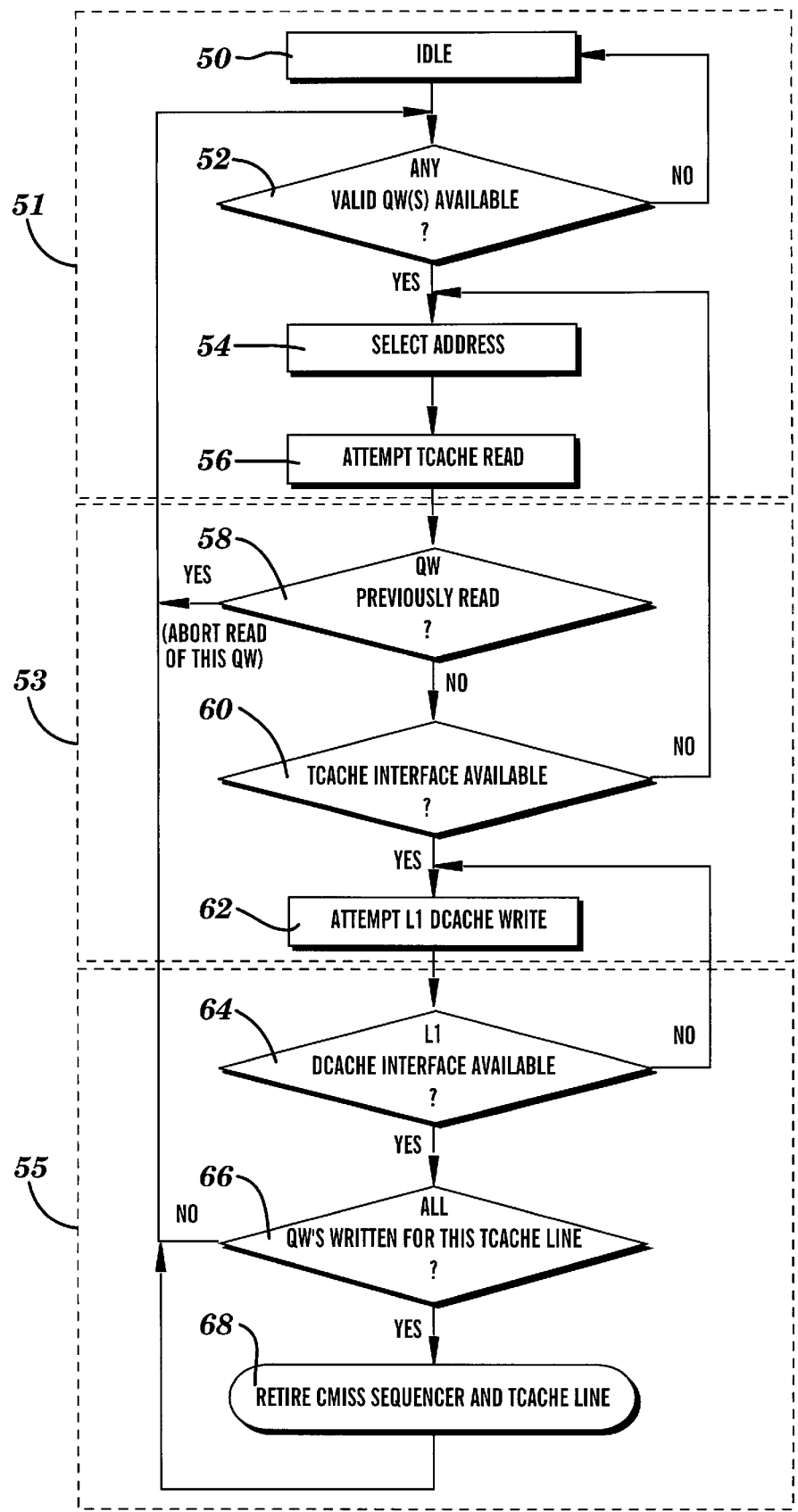
FIG. 2 is a flow diagram showing a method of transmitting data from a Tcache to a level one data cache in accordance with a preferred embodiment of the present invention.

Referring now to FIG. 2, a flow diagram is shown depicting the control logic associated with the line fill sequencer 42 of FIG. 1. Note that the fill logic is "pipelined" such that data packets may be operated on independently within each of a first, second and third stage, 51, 53 and 55. Thus, as attempted Tcache reads occur at the end of the first stage 51, an attempted L1 Dcache write may occur at the end of the second stage 53.

In operation, the line fill sequencer loops between boxes 50 and 52 until a data packet is available in the Tcache 12 for delivery to the L1 Dcache 14. It is important to note that the line fill sequencer 42 does not care where the data packet originated (e.g., from the system bus 16 or the L2 Dcache 18, or some other data device) or whether or not a previous line of data has been completely written into the L1 Dcache.

During each clock cycle, an address for a data packet is selected from among any of the available data packets in the Tcache 12 (box 54) and an attempt to read the data at the selected address from the transition cache is made (box 56). The system first checks to see if this data packet was written during the previous cycle (box 58), and if so, returns control back to the initial loop between boxes 50 and 52. If the address was not previously read, then the line fill sequencer checks to see if a Tcache interface is available (box 60). If the Tcache interface is not available, then control is diverted back to box 54 where another address is selected. If the Tcache interface is available, then the system attempts to write the data packet to the L1 Dcache (box 62).

Next, the system checks to see if the L1 Dcache interface is available (box 64). If it is not available, then control is diverted back to box 62 where another attempt to write to the L1 Dcache is made. If an interface is available, then the data is written into the L1 Dcache. Next, the system checks to see if all the data packets have been written for this particular cache line (box 66). If all of the data packets have not been written, then control is returned back up to box 50 and 52 where the system waits for a next available data packet. If all of the data packets have been written for this particular line of data, then the system will retire the cache miss sequencer and Tcache line (box 68). Once retired, control is then returned back up to boxes 50 and 52 where the system waits for a next available data packet.

Figure 3:
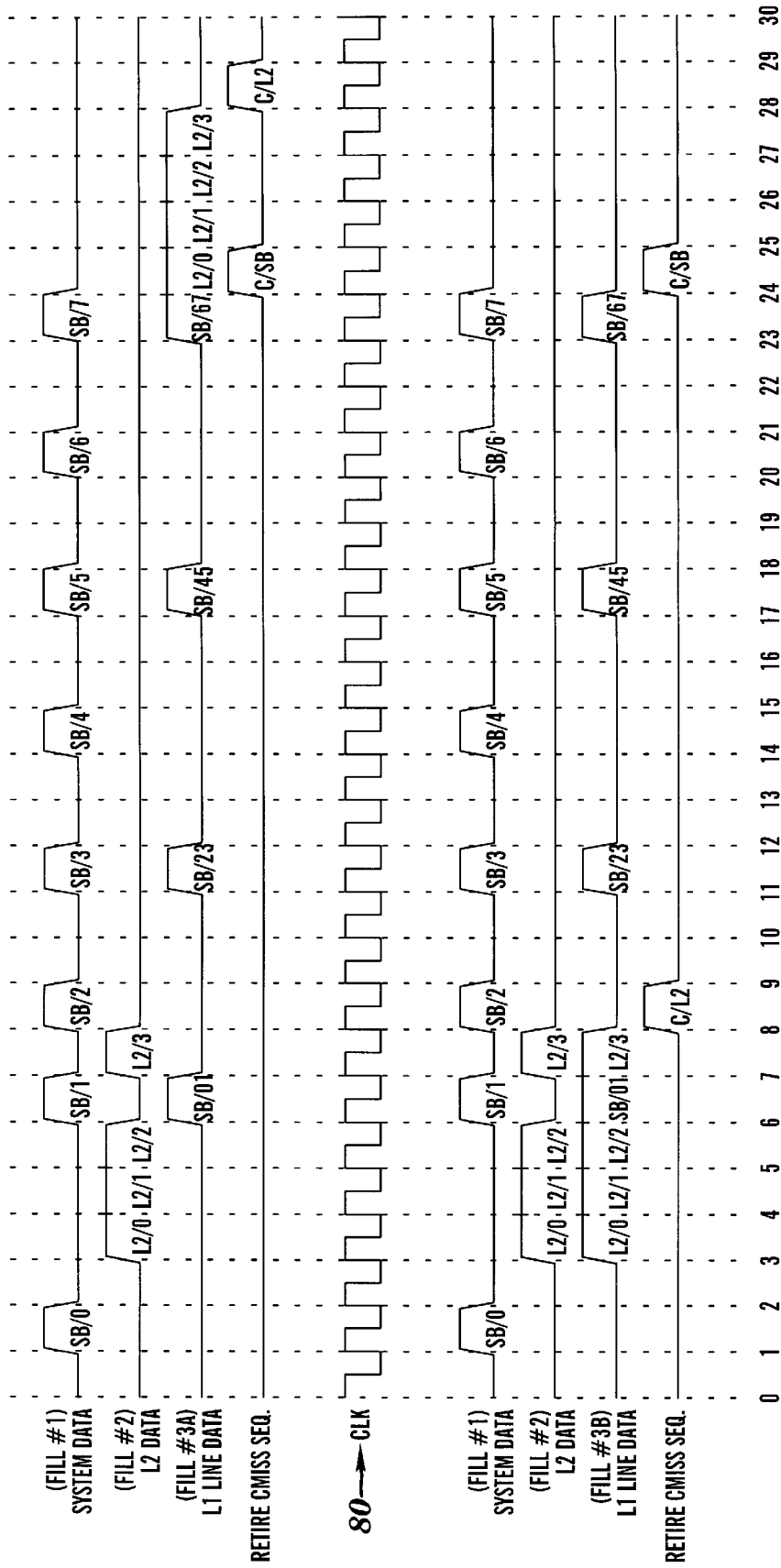
FIG. 3 depicts a pair of timing diagrams showing a system not utilizing interleaved data transmission and a system using interleave data transmission between a Tcache and level I data cache in accordance with a preferred embodiment of the present invention.

Referring now to FIG. 3, a pair of timing diagrams are shown depicting a first system (above the clock signal 80) that does not do interleaving pursuant to this invention, and a second system (below the clock signal 80) that does do interleaving pursuant to this invention. Both diagrams depict a first line of data, comprised of 16-byte quad words, being written from the system bus to the Tcache (Fill #1), and a second line of data, comprised of 32-byte oct-words, being written from the L2 Ddata cache to the Tcache (Fill #2). Both diagrams then depict the timing involved in transferring the two lines of data from the Tcache to the L1 Dcache (Fills #3A and #3B). Finally, both diagrams depict the point in time where the Cmiss sequencers associated with the two lines of data (C/SB and C/L2) are retired. It is assumed that the Tcache and L1 Dcache interfaces are available for the fills to occur unimpeded, and that the data is quad word aligned. The system bus, L1 Dcache and L2 Dcache are also assumed to be transferring their full bandwidth of data each cycle. Finally, data being written into the Tcache is fully passable to the L1 Dcache so no extra cycle is required for data that was written to the Tcache to be read the next cycle.

It can be seen in the first timing diagram that before any data packets originating from the L2 Dcache (L2/0–L2/3) can be written into the L1 Dcache, the system must wait until a complete line's worth of data packets from the system bus (SB/0–SB/7) are written into the L1 Dcache. Thus, even though L2 Dcache data was received into the Tcache during clock cycles 3, 4, 5 and 7, the L2 Dcache data cannot be written into the L1 Dcache until clock cycles 24, 25, 26 and 27, respectfully. The reason is that in this case, because system bus data was first to be received into the Tcache, the interface between the Tcache and L1 Dcache remains dedicated to data from the system bus until a complete line of data is written. Accordingly, the Cmiss sequencer associated with the L2 Dcache data (C/L2) cannot be retired until clock cycle 28.

Referring now to the second set of waveforms (below clock signal 80), it can be seen that data originating from the L2 Dcache (L2/0–L2/3) need not wait until a complete line of system bus data (SB/0–SB/7) completes a write before L2 Dcache data is written into the L1 Dcache. For example, during Fill #3B, data packet L2/0 is written into the L1 Dcache at clock cycle 3, which is the same time at which it was received in the Tcache. Because this data packet is the only available data packet in the Tcache, the system goes ahead and writes it out to the L1 Dcache. It can be seen that data packets from the system bus (e.g., SB/01 and SB/23) may often be interleaved with data from the L2 Dcache (e.g., L2/2 and L2/3). Accordingly, the Cmiss sequencer associated with the L2 Dcache data (C/L2) can be retired at clock cycle 8 as opposed to clock cycle 28, which was the result in the above example.

The embodiments and examples set forth herein were presented in order to best explain the present invention and its practical application and to thereby enable those skilled in the art to make and use the invention. However, those skilled in the art will recognize that the foregoing descriptions and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

We claim:

1. A computer system comprising:

a system bus;

a level two data cache;

a transition cache interfaced with said system bus and said level two data cache, said transition cache including a first plurality of memory lines for storing lines of data comprising data packets received from said system bus and said level two data cache;

a level one data cache interfaced with said transition cache and having a second plurality of memory lines for receiving said data packets from said transition cache; and a line fill sequencer for interleaving received data packets stored in said transition cache and causing any available data packet to be written to a predetermined memory line in said level one cache, irrespective of whether the available data packet is received from said system bus or said level two data cache.

2. The computer system of claim 1 wherein each of said data packets is a quad-word containing 16 bytes of data.

3. The computer system of claim 2 wherein each of said memory lines can hold 8 quad-words.

4. The computer system of claim 1 further comprising a cache miss sequencer for causing a predetermined line of data available from either said level two cache or said system bus to be retrieved when said predetermined line of data does not reside in said level one data cache.

5. The computer system of claim 1 wherein said line fill sequencer allows packets of data originating from said level two cache to be interleaved with packets of data originating from said system bus during writes from said transition cache to said level one cache.

6. A transition cache system for controlling the flow of lines of data from a plurality of data devices to a primary data cache, wherein each line of data includes a plurality of data packets, said transition cache system comprising:

a transition cache having a memory for receiving said plurality of data packets from said plurality of data devices; and a line fill sequencer for interleaving data packets received in said transition cache from said plurality of data devices and causing any available data packet to be immediately written to a predetermined memory line in said primary data cache.

7. The transition cache system of claim 6 wherein said plurality of data devices comprise a level two cache and a system bus.

8. The transition cache system of claim 6 wherein said primary data cache comprises a level one data cache.

9. The transition cache system of claim 6 wherein each of said plurality of data packets is a quad-word includes up to 16 bytes of data.

10. The transition cache system of claim 6 wherein each of said lines of data contains up to 128 bytes of data.

11. The transition cache system of claim 6 wherein said line fill sequencer allows data packets originating from a first data device to be interleaved with data packets originating from a second data device during writes to said primary data cache.

12. A method of transferring line fill data from a transition cache to a level one data cache wherein said line fill data comprises lines of data each comprising a plurality of sequentially transmitted data packets and wherein each line of data originates from any one of a plurality of data devices, said method comprising the steps of:

(1) providing the transition cache with multiple lines such that the transition cache can receive data packets from the plurality of data devices;

(2) checking said transition cache to see if a data packet has been received from any of said plurality of data devices;

(3) if no data packets have been received, repeating step (2);

(4) if only one data packet has been received in said transition cache, selecting in an interleaved manner said one data packet without regard to its origin;

(5) if a plurality of data packets have been received in said transition cache, selecting any one of said plurality of data packets without regard to its origin;

(6) attempting a read of said selected data packet from said transition cache;

(7) if said read was successful, attempting a write of said selected data packet to said level one data cache; and (8) returning to step (2).

13. The method of claim 12 further comprising the step of retiring a cache miss sequencer if an entire line of data from one of said data devices was successfully written to said level one cache.

14. The method of claim 12 further comprising the step of aborting said attempted write if said selected data packet was a previously selected data packet during a prior iteration of steps (2) through (7).

15. The method of claim 12 wherein said step of checking said transition cache is done once during each of a plurality of system clock cycles.

16. The method of claim 12 wherein a selection process is used to select said selected data packet in step (5) and wherein said selection process may select any available data packet regardless of the data device from which the selected data packet originated.

17. The method of claim 12 wherein said method allows for interleaved data packets to be transferred from said transition cache to said level one cache.

* * * * *